United States Patent
Meyer et al.

(10) Patent No.: US 10,380,287 B1
(45) Date of Patent: Aug. 13, 2019

(54) SYSTEMS AND METHODS FOR MODIFYING A BALANCED CLOCK STRUCTURE

(71) Applicant: Cadence Design Systems, Inc., San Jose, CA (US)

(72) Inventors: Dirk Meyer, Elsworth (GB); Zhuo Li, Austin, TX (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 280 days.

(21) Appl. No.: 15/638,048

(22) Filed: Jun. 29, 2017

(51) Int. Cl.
    *G06F 17/50* (2006.01)

(52) U.S. Cl.
    CPC ...... *G06F 17/5031* (2013.01); *G06F 17/5045* (2013.01); *G06F 17/5077* (2013.01)

(58) Field of Classification Search
    CPC ............. G06F 17/5031; G06F 17/5045; G06F 17/5077
See application file for complete search history.

(56) References Cited

U.S. PATENT DOCUMENTS

| | | | | |
|---|---|---|---|---|
| 2001/0011929 | A1* | 8/2001 | Fairbanks | H03K 3/0315 331/57 |
| 2014/0132305 | A1* | 5/2014 | Gaide | G06F 1/10 326/93 |
| 2016/0275230 | A1* | 9/2016 | Ahluwalia | G06F 17/5077 |

* cited by examiner

*Primary Examiner* — Suchin Parihar
(74) *Attorney, Agent, or Firm* — Schwegman Lundberg & Woessner, P.A.

(57) ABSTRACT

Electronic design automation systems, methods, and media are presented for modifying a balanced clock structure. One embodiment involves accessing a circuit design comprising an H-tree clock distribution network that provides a clock signal to a plurality of sinks. Timing requirements for each sink are identified, and a plurality of early tapoff candidate locations are also identified. A corresponding arrival time adjustment associated with each early tapoff candidate location is estimated for early sinks, and an early tapoff location is selected for each early sink based on the early arrival timing requirement and the arrival time adjustment associated with the tapoff location. In various embodiments, different criteria may be used for selecting the early tapoff location, and updated circuit designs are then generated with a route from early sinks to the early tapoff location selected for each early sink.

20 Claims, 9 Drawing Sheets

SYSTEMS AND METHODS FOR MODIFYING A BALANCED CLOCK STRUCTURE

TECHNICAL FIELD

Embodiments described herein relate to electronic design automation (EDA), and to systems, methods, devices, and instructions for generating library constructs and performing timing analysis operations as part of the generation of circuit designs.

BACKGROUND

Electronic design automation (EDA) is a category of systems for assisting with the design of electronic systems and devices. Large, integrated circuit designs are often assembled from previously designed blocks. This enables reduced turnaround times for generation of an integrated circuit. Schematic and layout information for such block portions of a design may be exchanged or licensed as intellectual property. Timing analysis is an EDA verification analysis whereby the timing of circuit elements and/or circuit blocks is analyzed to verify that the design meets constraints in order to operate at intended clock rates in an expected operating environment.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
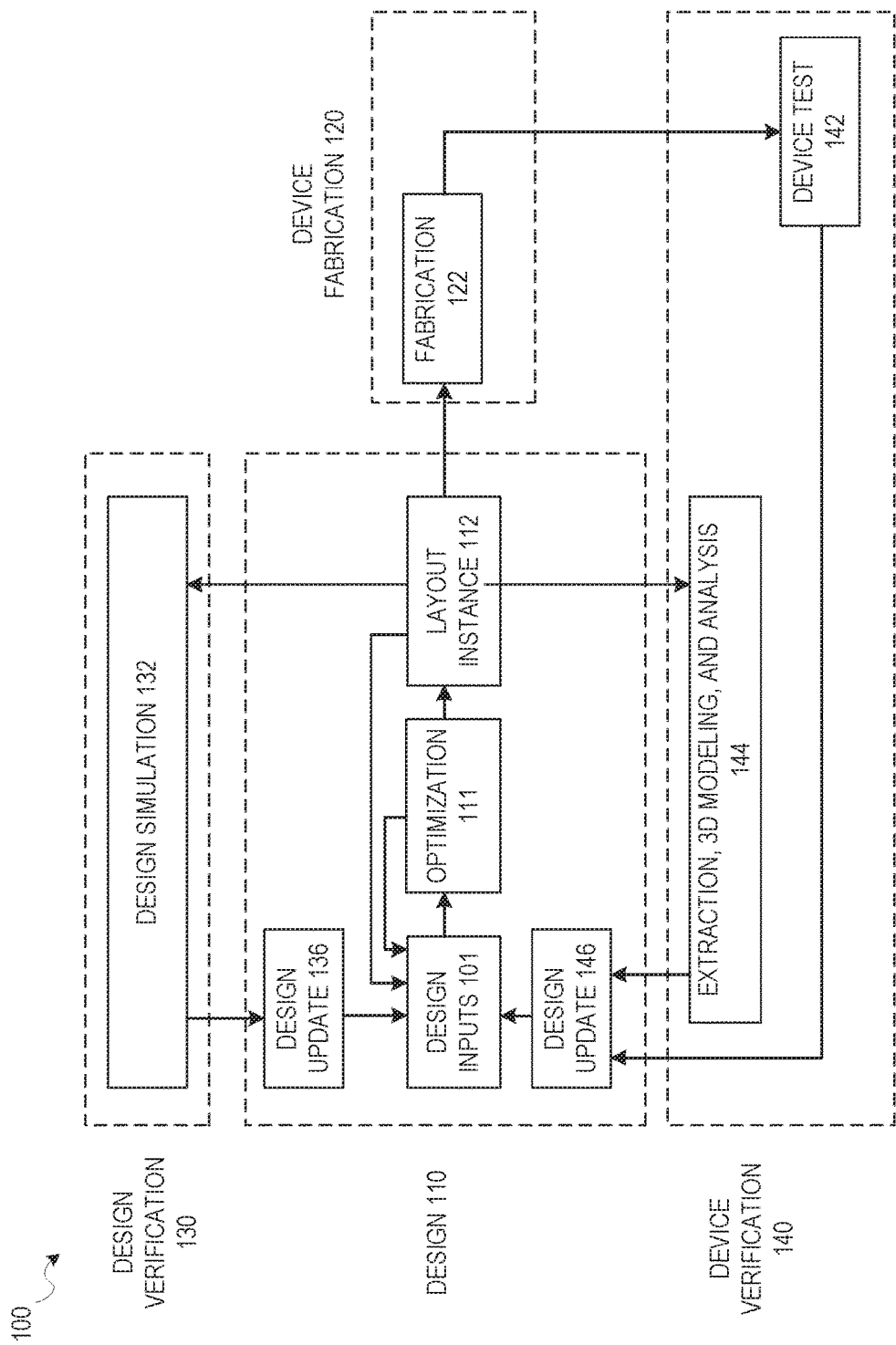
FIG. 1 is a diagram illustrating one possible design process flow which includes elements for modifying a balanced clock structure with early sinks in accordance to some embodiments.

Embodiments described herein relate to electronic design automation (EDA) and to methods, computer media, and devices used for analyzing, optimizing, and creating electronic circuits. Particular embodiments relate clock distribution networks within a circuit design and modification of balanced clock structures to deal with early sinks. Some embodiments include automatic addition of early tapoffs to a balanced clock structure in order to compensate for early sinks within a circuit design. In various embodiments, different criteria may be used for determining appropriate locations for early tapoffs. While certain example embodiments are discussed, it will be apparent that other embodiments not specifically described herein, including embodiments using hierarchical timing analysis performed at any stage of a circuit design, are possible in accordance with the various embodiments presented herein.

Clock trees or clock distribution networks are a part of synchronous circuits that operate to manage synchronization of signals in different parts of an integrated circuit. The clock distribution network carries a clock signal to clocked circuit elements (e.g., flip-flops, clocked buffers, clocked circuit cells, etc.). If appropriately designed, clock distribution networks allow circuit elements in different parts of a circuit to receive a clock signal in a synchronized fashion. A balanced clock structure refers to a structure that is balanced in various ways to limit variations in the clock signal received at different parts of a circuit. The symmetric nature of a balanced clock tree provides improved cross-corner skew and overall operation in different operating conditions. This includes structural balances as well as balance of various loads on the clock distribution network. Lack of balance results in an increase in various problem sources, such as clock jitter and clock skew, that can cause a mismatch between circuit elements. Some embodiments may particularly have issues with varying clock skew under different operating conditions.

In some circuit designs, some synchronized elements have a shared timing requirement, where the goal of a clock distribution network is to provide the synchronized elements with the same clock signal at the same time with limited error sources. Elements that receive a clock signal from a clock tree structure are referred to herein as sinks. In addition to sinks designed to receive the same clock signal at the same time, some circuit designs additionally include "early sinks" which are scheduled to receive a clock signal earlier than other sinks operating at a standard shared timing. Such an early sink may, for example, be a "macro" that includes multiple sinks within the macro, as well as internal transmission lines that add delays to the clock signal. Such a macro may be used within a circuit design to simplify the design process and maintain structures within the macro. The design limitations for when different sinks (e.g., circuit elements, design macros, etc.) should receive a clock signal are referred to as timing requirements.

Embodiments described herein operate to analyze an initial circuit design with a balanced clock tree structure, and to modify the balanced clock tree structure with an early tapoff to appropriately satisfy the timing requirements of one or more early sinks. As detailed herein, a "tapoff" refers to the sinks of a balanced clock structure. Other sinks which are not tapoffs include other sinks of a complete clock structure, such as clock input pins of flip-flops (e.g. registers) on the boundary between the clock network and the datapath. Once an early tapoff location is selected, the early tapoff and a clock path from the early tapoff to the early sink are included in an updated circuit design. Details of automatic selection of early tapoff locations are described in detail below.

FIG. 1 is a diagram illustrating one possible design process flow which includes elements for modifying a balanced clock structure with early sinks in accordance to some embodiments. This includes possible design process flows for timing and signal integrity analysis to generate a circuit design and an associated circuit in accordance with various example embodiments, and operations for modifying such circuits automatically to set early tapoffs within a balanced clock tree structure for early sinks. It will be apparent that other design flow operations may function using the timing constraints and optimizations described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts for a balanced clock tree structure and sinks are generated, before adjustments are made to ensure that timing requirements for each sink are met. The initial strategy, tactics, and context for the device to be created are also generated in the design input operation 101, depending on the particular design algorithm to be used.

In some embodiments, following an initial selection of design values in design input operation 101, clock tree synthesis and associated timing analysis and optimization according to various embodiments occurs in an optimization operation 111, along with any other automated design processes. As described below, design constraints for a clock tree structure and sinks which receive a clock signal from the clock tree structure may be initiated with design inputs in design input operation 101, and then may be analyzed using timing analysis according to various embodiments. While design flow 100 shows such optimization occurring prior to layout instance 112, such timing analysis and optimization may be performed at any time to verify operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for modifying a balanced clock tree structure may therefore involve iterations of design input operation 101, optimization operation 111, and layout instance 112 generation. In other systems, other design processes may be used.

After design inputs are used in design input operation 101 to generate a circuit layout, and any optimization operations 111 are performed, a layout is generated in layout instance 112. The layout describes the physical layout dimensions of the device that match the design inputs. This layout may then be used in a device fabrication operation 122 to generate a device, or additional testing and design updates may be performed using designer inputs or automated updates based on the design simulation 132 operations or extraction, 3D modeling, and analysis 144 operations. Once the device is generated, the device can be tested as part of device test 142 operations, and layout modifications generated based on actual device performance.

As described in more detail below, design updates 136 from design simulation 132; design updates 146 from device test 142 or extraction, 3D modeling, and analysis 144 operations; or direct design input operation 101 may occur after an initial layout instance 112 is generated. In various embodiments, whenever design inputs are used to update or change an aspect of a circuit design, a timing analysis and optimization operation 111 may be performed.

Figure 2:
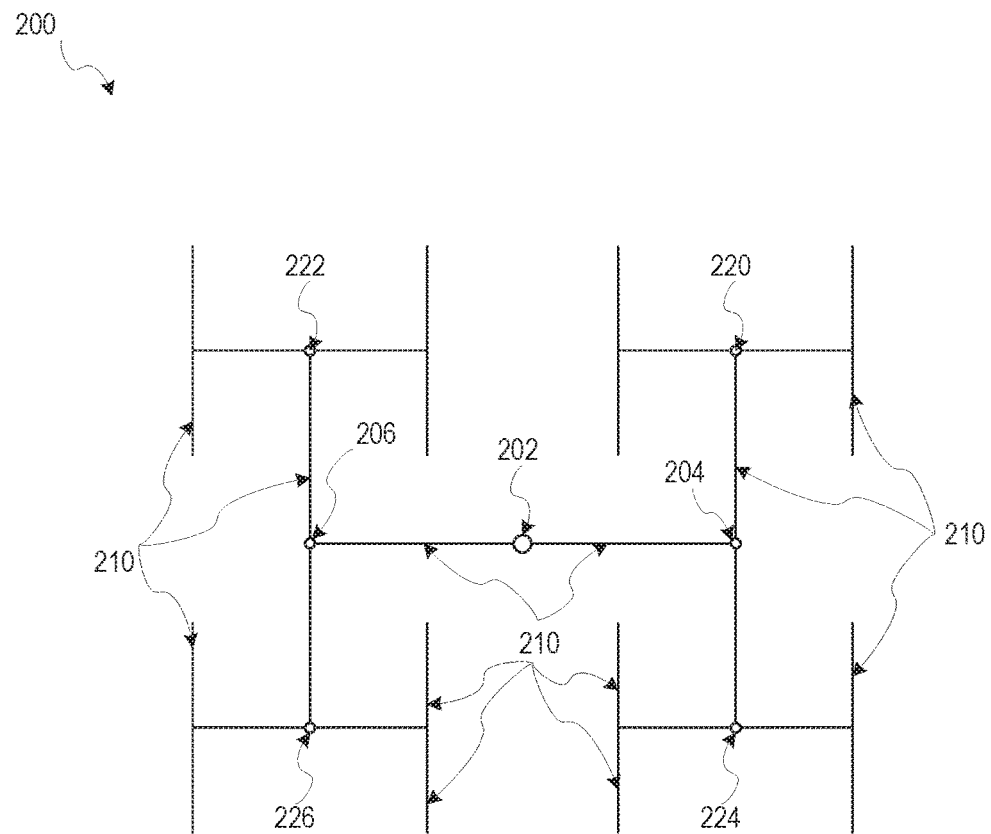
FIG. 2 illustrates aspects of an example balanced clock structure in accordance with some embodiments described herein.

FIG. 2 then illustrates aspects of an example balanced clock structure 200 in accordance with some embodiments described herein. In particular, FIG. 2 shows levels of an H-tree structure that includes paths 210, endpoints 204, 206, 220, 222, 224, and 226, and root clock input 202. An H-tree is generated by starting with a line segment and adding two shorter line segments, with the middle of the shorter line segments attached to each end of the longer line segment. This process may then be repeated as illustrated to generate a structure with any number of levels.

In the absence of other factors such as load imbalances, variations in path line width, and such, clock structure 200 is balanced in that a clock signal that starts at root clock input 202 will reach segment endpoints of each layer of the H-tree structure at the same time. Timing delay as the clock signal moves along the transmission paths 210 from root clock input 202 will thus reach first layer endpoints 204 and 206 at the same time. As the clock signal further propagates, the equal path distances similarly result in the delay from root clock input 202 to second level endpoints 220, 222, 226, and 224 being equal. Such a structure may be expanded down many levels to accommodate any number of sinks that receive and use the clock signal. In some embodiments, the symmetric structure does not expand to elements on the boundary between the datapath an clock network, but instead are structured as a symmetric "top" part of the clock structure that connects to "bottom" portions. In various circuit designs, multiple clock structures similar to balanced clock structure 200 may be used, such that a single circuit design may have more than one H-tree clock distribution network serving different parts of the circuit. Additionally, embodiments described herein can be applied to electrically symmetrical structures (e.g. structures that may have different physical path lengths but symmetrical electrical or timing paths under operation) in addition to the geometrically symmetrical structures described herein (e.g. H-trees). Further, some embodiments may have different tiers of structures. For example, an initial number of tiers may use a symmetrical H-tree structure, and lower tiers may use different structures. Certain structures may have branches (e.g. one or more paths) that are unbalances, but where the paths from the root to each tapoff have the same or similar path length and electrical properties. In some embodiments, this is achieved by using buffers with unconnected outputs in some parts of the structure to match nets at the same level which are on the paths to a tapoff. For example, in one embodiment, a root is directly connected to a first tier with two symmetrical branches. One first tier branch may lead to two additional branches in a second tier, with each second tier branch having a buffer connected to a tapoff. The other first tier branch may have one second tier branch with a buffer connected to a tapoff, but another second tier branch with a buffer having an unconnected output to match the net of other branches in the second tier of the structure. In various embodiments, this may occur in any tier of a structure with any operationally viable of branches.

Figure 3A:
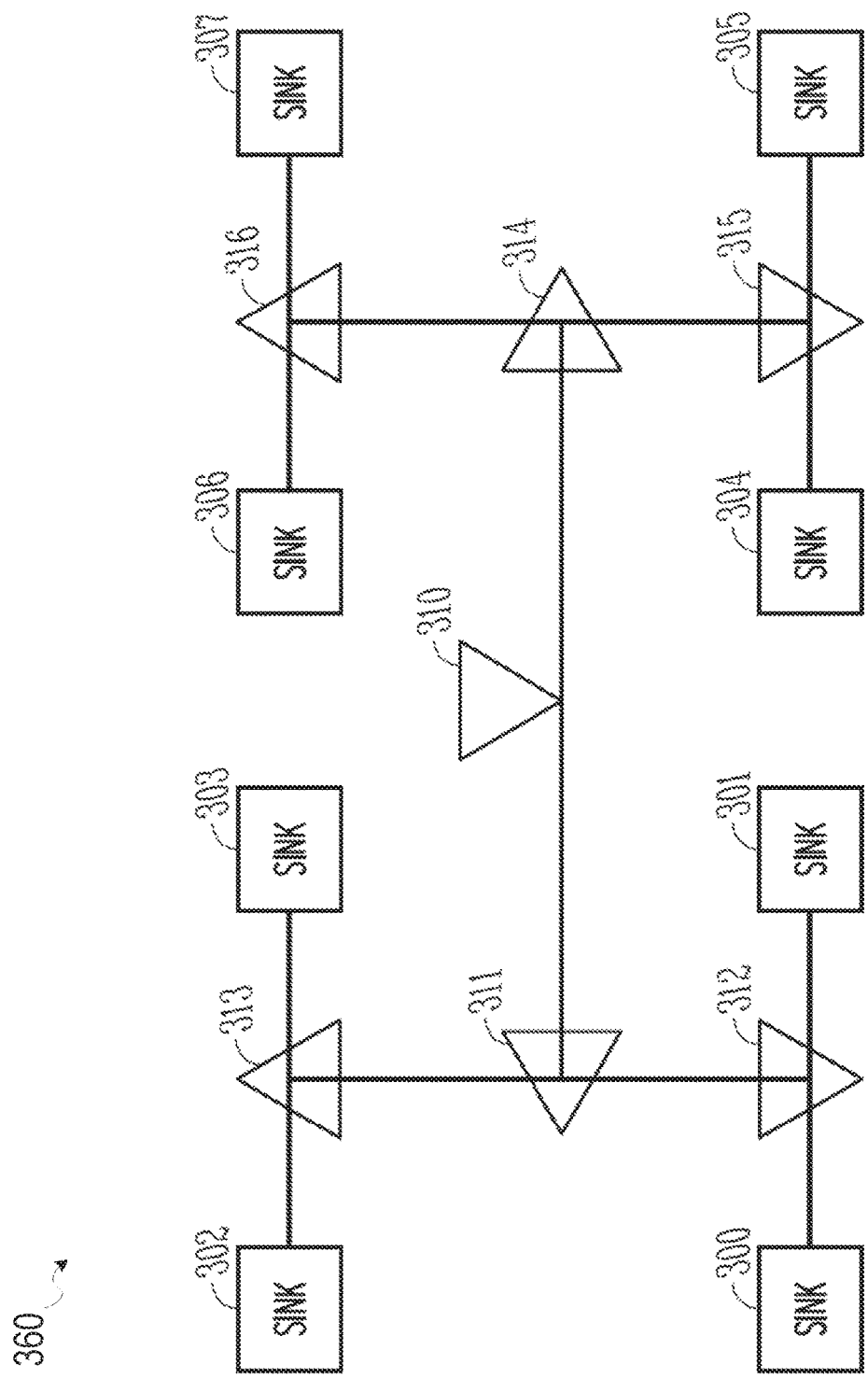
FIG. 3A illustrates aspects of an example balanced clock structure in accordance with some embodiments described herein.

FIGS. 3A-D then illustrate an embodiment for modifying a balanced clock tree structure with an early tapoff to accommodate an early sink. FIG. 3A illustrates aspects of an example balanced clock structure 360 in accordance with some embodiments described herein. The balanced clock structure 360 includes sinks 300-307, root clock input 310, and buffers 311-316. In various embodiments, buffers such as buffers 311-316 are included in a clock distribution network to manage the propagation of the clock signal from the root clock input to the sinks through a complex set of paths that may connect the clock signal to a large number of sinks. In some systems, a single clock tree network may connect to more than 10,000 or more than 100,000 sinks. In such complex systems, errors and operational complexity from a simple metal mesh of clock paths would render the clock distribution network non-functional. Buffers manage the integrity of the clock signal to maintain a high-quality signal through the clock tree network. Certain embodiments herein may refer to buffers in a clock distribution network. It will be understood that inverters, buffer circuits, or other such circuits for maintaining the quality of the clock signal may be used within a clock tree and referred to herein as buffers.

Figure 3B:
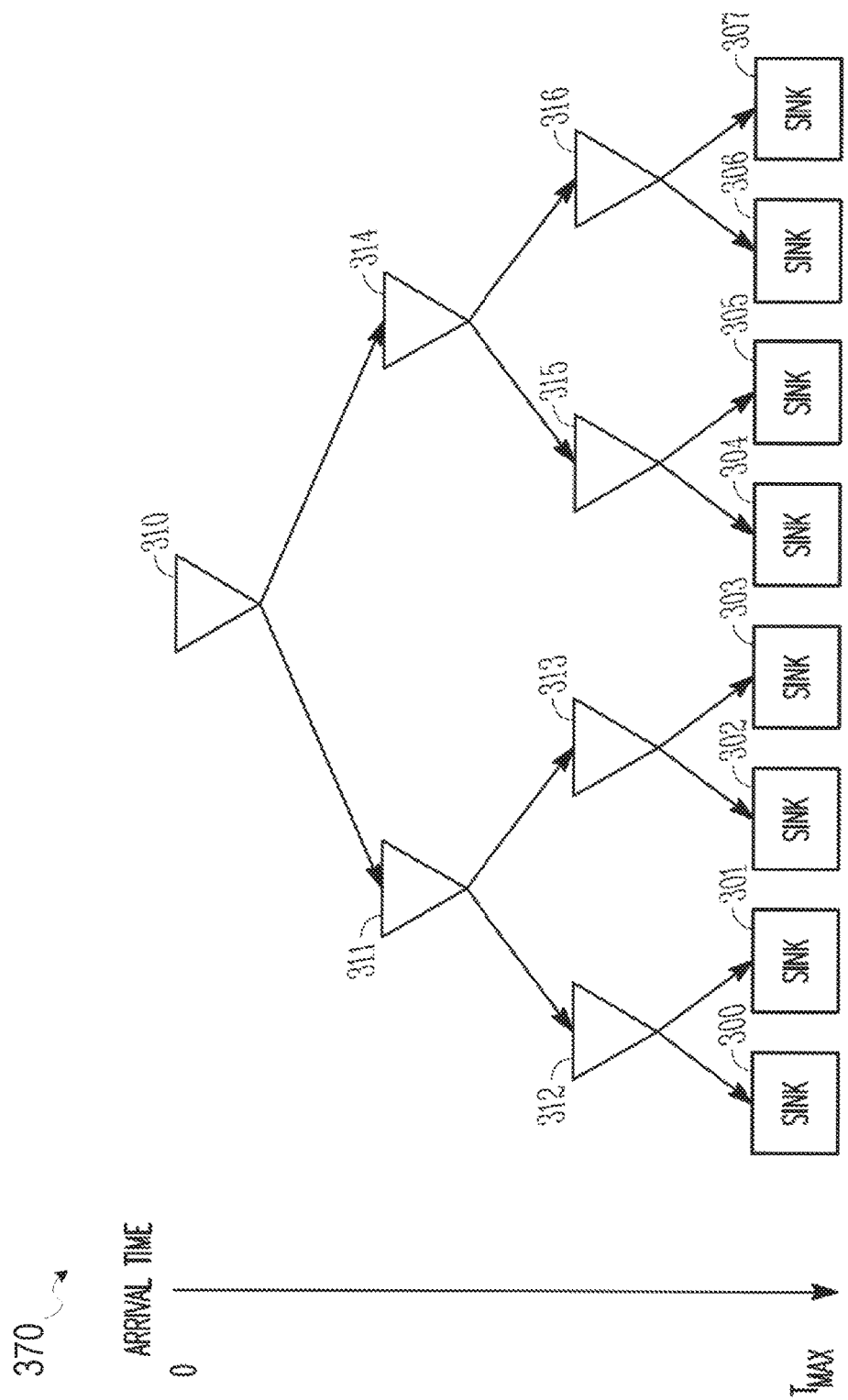
FIG. 3B illustrates aspects of an example balanced clock structure in accordance with some embodiments described herein.
Figure 3C:
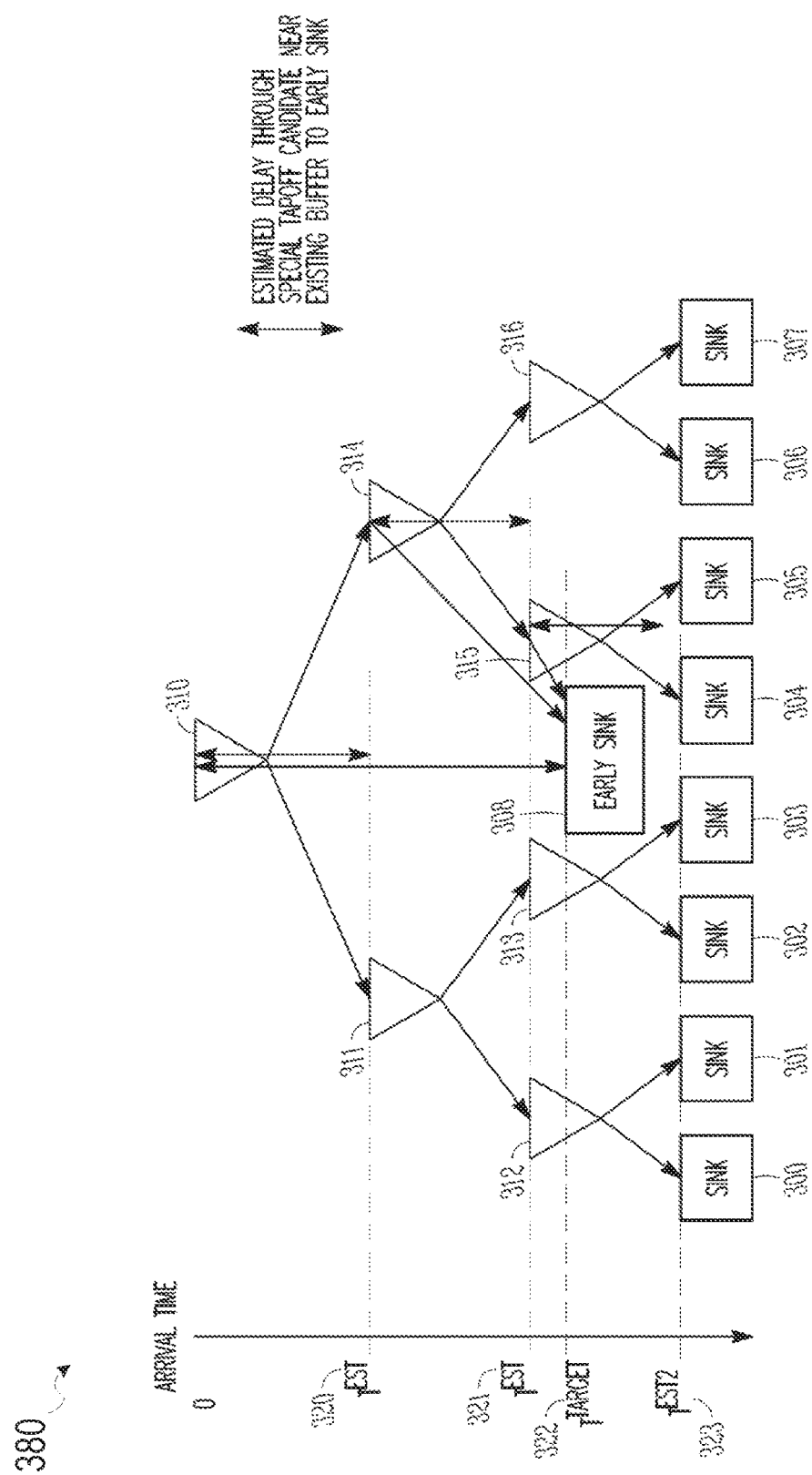
FIG. 3C illustrates aspects of an example balanced clock structure with an early sink in accordance with some embodiments described herein.

FIGS. 3B and 3C illustrate further aspects of the example balanced clock structure 360 in accordance with some embodiments described herein. FIG. 3B shows a simplified timing chart 370 that illustrates the timing delay from root clock input 310 to sinks 300-307 via buffers 311-316 (e.g., an arrival time). Balanced clock structure 360 includes only sinks having a shared arrival time, which may be a standard arrival time for synchronized circuit elements in a portion of a circuit design. Each such sink 300-307 may thus be connected to a segment end at the bottom level of an H-tree structure, and assuming ideal transmission of the clock signal through the H-tree, the clock will arrive at each of these sinks 300-307 at the same time. In actual circuits, imbalances in load, routing, or other such elements of a clock distribution signal can be accommodated with path length adjustments, buffers, or other such changes to match these sinks that share a standard arrival time to the clock signal in a synchronized fashion.

FIG. 3C then shows timing chart 380, which adds early sink 308 and additional details of the arrival times for the buffers and sinks. As described above, early sink 308 has a different timing requirement from sinks 300-307 that share a standard system timing requirement. Early sink 308 may, for example, be a macro with multiple sinks inside the macro, set transmission line structures, or other limitations that require a clock input to the macro at an earlier time than the time the clock arrives at sinks 300-307. Such macros may be used to simplify the circuit design by treating repeated blocks of circuit elements in a standard way to reduce the computing load during analysis and avoid generating unexpected problems by maintaining a fixed sub-design within a macro block. In other systems, other system designs or elements may involve sinks with timing requirements that differ from the timing requirements of other sinks within the same clock tree, even for systems that use multiple clock trees. In FIG. 3C, timing chart 380 shows an estimated arrival time 320 for buffers 311 and 314, an estimated arrival time 321 for buffers 312, 313, 315, and 316, and an estimated arrival time 323 for sinks 300-307. Additionally, an arrival time target 322 for early sink 308 is shown. Arrival time target 322 is an arrival time associated with an arrival time adjustment from the standard arrival time in order to meet the timing requirements of the clock input to early sink 308.

Because arrival time target 322 does not match the standard timing requirement of estimated arrival time 321, early sink 308 requires an arrival time adjustment and cannot simply be attached to a segment endpoint of the balanced clock tree structure (e.g., an endpoint at the bottom level of an H-tree). In order to compensate for this early arrival timing requirement of the early sink, an early tapoff location is selected for the early sink so that the clock signal will arrive at the early sink to match arrival time target 322 (e.g., an early arrival timing requirement).

Figure 3D:
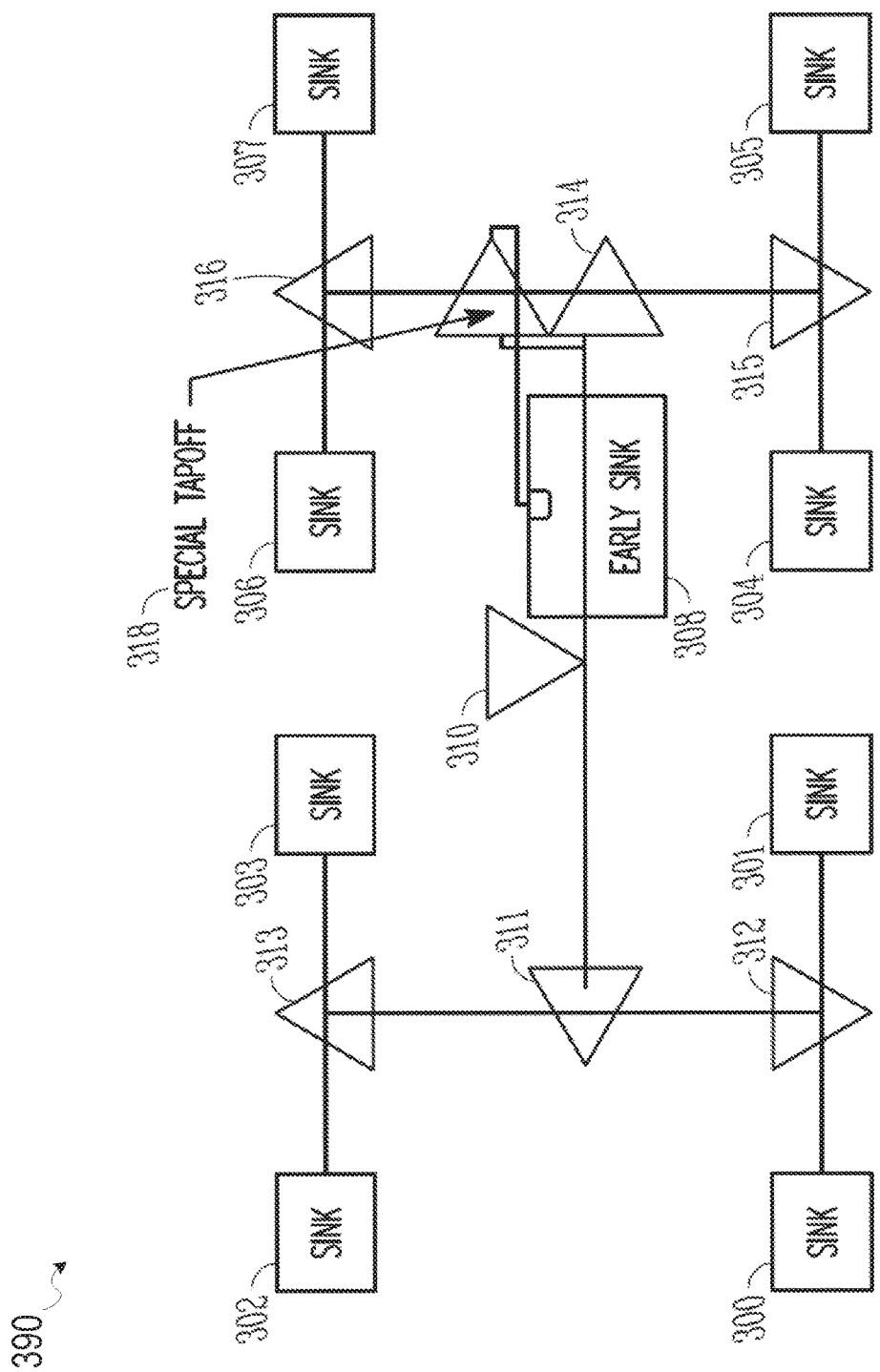
FIG. 3D illustrates aspects of an example balanced clock structure with an early sink and an early tapoff modification in accordance with some embodiments described herein.

FIG. 3D illustrates aspects of an example updated clock structure with an early sink and an early tapoff modification in accordance with some embodiments described herein. An early tapoff is a modification to a balanced clock tree structure to accommodate the early arrival timing requirement of the early sink. FIG. 3D shows updated clock tree structure 390 with early tapoff 318 and a route from early tapoff 318 to early sink 308 that results in the clock signal arriving at early sink 308 at arrival time target 322. In some embodiments, an early tapoff as described herein is considered a path (e.g., one or more transmission lines that may be connected via buffer elements, inverter elements, or other circuit elements) that is part of a clock tree structure that does not fit within the standard structure of the balanced clock tree.

In order to generate updated clock tree structure 390 with early tapoff 318 and a route that results in the clock signal arriving at early sink 308 at arrival time target 322 while minimizing impacts on other elements of the clock tree, early tapoff 318 cannot simply be selected randomly. In various embodiments, the location of early tapoff 318 may be selected in a variety of different ways.

In some embodiments, existing buffers are used as candidate locations for an early tapoff. Placing an early tapoff in association with an existing buffer allows the early tapoff to have a limited impact on other elements in the circuit. In such embodiments, a computing device that is used for design inputs, optimization, and/or clock tree synthesis accesses circuit design inputs from memory with details of an initial clock distribution network to calculate an estimated arrival time for each buffer of the plurality of buffers and for each sink of the plurality of sinks. The early sinks are identified based on the estimated arrival time for each sink of the plurality of sinks and delay threshold. The estimated arrival time for the early sinks are then compared against the buffer locations that have been identified as candidate locations for an early tapoff. The computing device determines the impact that connecting each early sink to the corresponding tapoff candidate location would have. This estimates the arrival time adjustment to see if the new arrival time would fall within the timing requirements of the corresponding early sink. The buffer having the most appropriate location to meet the timing requirement of a particular early sink is selected, and an updated circuit design is then generated by inserting a corresponding early tapoff at the corresponding early tapoff location near the selected buffer for each early sink. The device then proceeds with re-routing modified nets of the balanced clock distribution network, and inserting one or more route paths between the corresponding early tapoff and an associated early tapoff candidate of the plurality of sinks. Fine tuning to meet the target arrival time may be done as part of the path routing between the early tapoff and the early sink.

In various embodiments, the calculations for the initial estimated arrival time against the updated arrival time using a particular candidate tapoff location may be calculated either as a latency from the root clock input or as an adjustment or offset from the target arrival time for other sinks in the clock tree that have a standard latency (e.g., estimated arrival time 323).

In other embodiments, rather than using buffers in the initial balanced clock tree as candidate locations for early tapoffs, other methods may be used to identify early tapoff candidate locations. In some embodiments, early tapoff candidate locations may be spread evenly through the paths of a clock tree network. In some embodiments, early tapoff candidate locations may be set so that each candidate is within a threshold distance of another candidate along the clock tree paths (e.g., every X micrometers (um)). The device may then calculate or estimate an impact on the arrival time for the early sink for all candidate locations, or for a selected subset of the candidate locations, and choose one of the candidates for an early sink by comparing the initial estimated arrival time against the new arrival time based on the impact of using a particular early tapoff location.

In some embodiments, a first set of candidate early tapoff locations using any set of candidates above is used to narrow down the criteria for an early tapoff location, and then a second set of candidate early tapoff locations are selected based on the results of the impact of the first set of candidate early tapoff locations. This may, for example, be used to narrow the possible location of an early tapoff candidate to a certain area of a circuit design using a widely spaced set of initial tapoff candidate locations, and then to pick a final selected tapoff location using finely spaced candidate locations within a small area of the circuit design.

Further still, other criteria may be used to select or to add weight to particular candidate locations as part of the selection process. Some embodiments may use a scoring value with weights for different criteria in addition to a simple match of target arrival times. Some embodiments add a weighting value to candidates with a greater amount of shared path from the root clock input, to increase a score or other selection value for such candidates.

Some embodiments may identify that a particular early sink includes direct connections to one or more other related sinks, and add weights to candidate tapoff locations that will increase the amount of clock path shared between the early sink and the related sink(s). For example, in FIG. 3C, sink 300 and sink 301 share the path from root clock input 310 to buffer 312, but sinks 300 and 307 do not share any of the clock path. Some embodiments select tapoff locations to match shared clock paths between an early sink and a particular other related sink.

Still further, for systems with multiple early sinks, a system may have criteria to limit early tapoff density within a small area of a design, or to prevent an excess number of early tapoffs from being placed within one segment of a clock tree path. For example, if an analysis process results in five early tapoffs being located in the clock path segment between buffer 311 and 312, with no early tapoffs elsewhere in the clock tree, the system may either add weights to increase the score of candidate tapoff locations outside this path, or may simply have a hard threshold limit on the number of tapoffs that may be placed along a single path segment of the clock tree. Similarly, a threshold limit may be placed on the number of early tapoffs within a given area of a circuit design, and if more early tapoffs than the threshold are identified for that area, one or more of the early tapoffs are pushed to a different area. Just as above, the method for selecting which early tapoffs to move may be based on a scoring selection to maximize the overall shared path with related sinks, to minimize the overall path added to the clock circuit, or any other such criteria.

In some embodiments, a design input may also identify areas or clock paths that are barred from accepting early tapoffs. Such embodiments may identify candidate locations for early tapoffs, and automatically discard any such paths within a barred location. Similarly, some embodiments may identify areas of a layout or paths in a clock tree that are the only allowed areas or paths for early tapoffs, with candidate locations restricted to those within the acceptable areas or along the acceptable paths.

Figure 4:
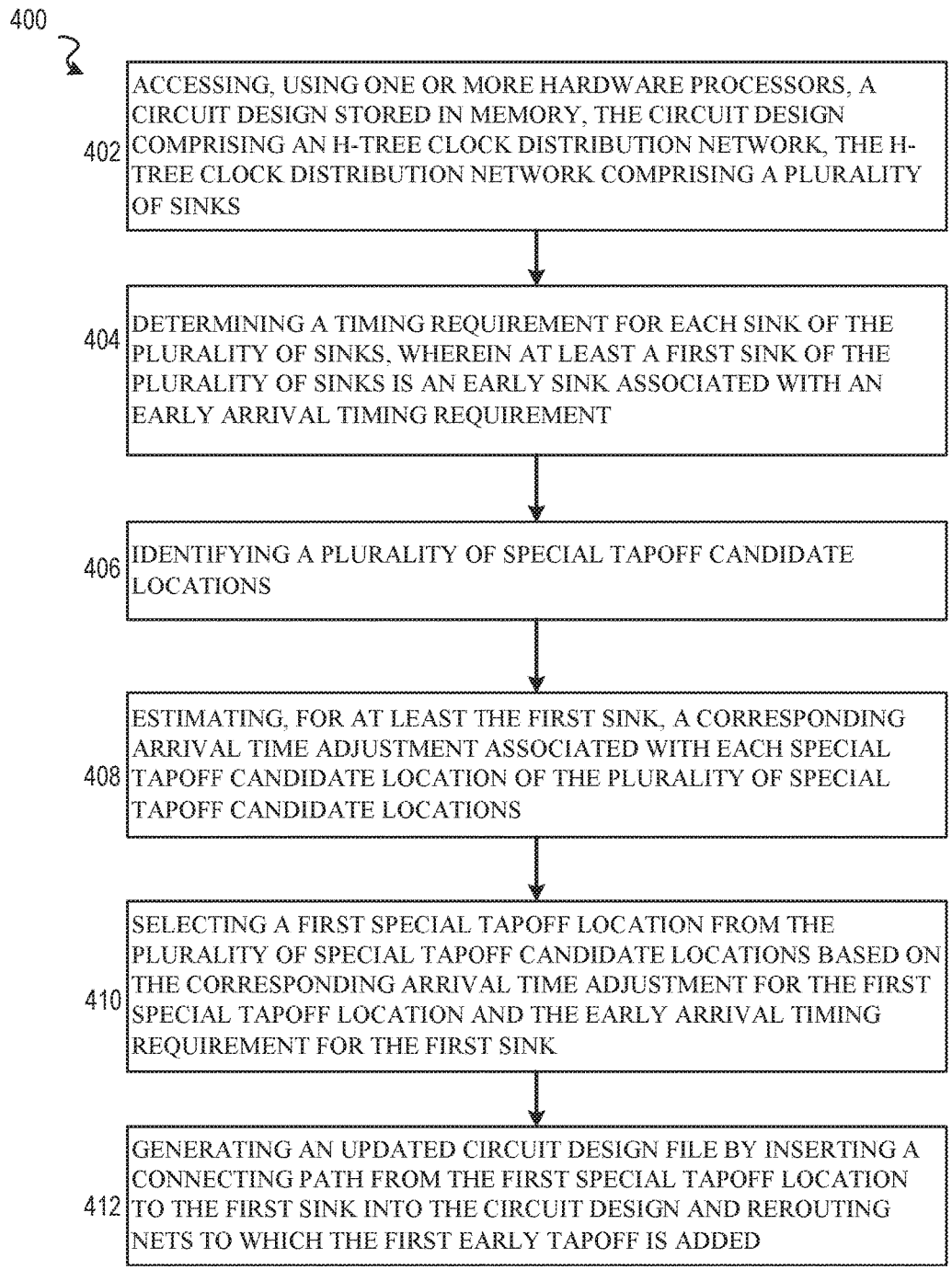
FIG. 4 describes a method for modifying a balanced clock structure in a circuit design in accordance with some embodiments.

FIG. 4 then describes a method 400 for modifying a balanced clock structure in a circuit design in accordance with some embodiments. In some embodiments, method 400 is implemented as a computer-readable storage medium comprising instructions that, when executed by one or more processors of a device, cause the device to perform the operations of method 400. Such an embodiment may include software executed on an EDA computing device that outputs updates to a circuit design on a display of the device, and receives inputs that may be further used to update and modify selected locations for early tapoffs. Some embodiments comprise a device that includes a memory with a circuit design, and processing circuitry configured into a special device to perform the operations of method 400.

Method 400 is particularly directed to an H-tree clock structure, but it will be apparent that other balanced structures may be used in accordance with the embodiments described herein. Method 400 includes operation 402 of accessing, using one or more hardware processors, a circuit design stored in memory, the circuit design comprising an H-tree clock distribution network, the H-tree clock distribution network comprising a plurality of sinks. If the circuit design includes more than one balanced clock distribution network, each distribution network may be processed independently, or at the same time.

A timing requirement for each sink of the plurality of sinks is then determined in operation 404. In operation 404 at least a first sink of the plurality of sinks is an early sink associated with an early arrival timing requirement. Such requirements may be determined by the circuit design, or may be estimated by modeling of the circuit.

A plurality of early tapoff candidate locations is then identified in operation 406. In some embodiments, the early tapoff candidate locations may be identified independently of a particular early sink. In other embodiments, details of a particular early sink (e.g., location, associated latencies and timing requirements, connections with other sinks, etc.) is used to limit the possible early tapoff candidate locations. Then operation 408 involves using the early tapoff candidate locations in estimating, for at least the first sink, a corresponding arrival time adjustment associated with each early tapoff candidate location.

Based on the corresponding arrival time adjustment for the first early tapoff location from operation 408 and the early arrival timing requirement for the first sink, a first early tapoff location from the plurality of early tapoff candidate locations is then selected in operation 410. Once the early tapoff location is selected in operation 410, an updated circuit design file is generated in operation 412. In some embodiments, this is performed by inserting a connecting path from the selected early tapoff location to the early sink in the circuit design file. In some embodiments, this is done at the same time when the rest of the clock tree under the tapoff is built. In various embodiments, the nets of the balanced clock structure to which the early tapoffs are added are re-routed to connect the early tapoffs to the rest of the balanced clock structure. Updating the circuit file thus includes both adding the early tapoff, connecting the early tapoff, and then adjusting the surrounding elements of the balanced clock structure (e.g. the branches or nets of the structure that include the early tapoff). In some embodiments, this may involve additional adjustments to the layout of the circuit to accommodate placement of new routes.

In addition to the operations described above for method 400, additional embodiments may operate such that a second sink of the plurality of sinks is associated with a standard latency for the H-tree clock distribution network. Additionally, in some such embodiments, the first sink is a macro comprising a plurality of internal timing requirements, and wherein one or more internal elements of the macro are associated with the standard latency for the H-tree clock distribution network. In other embodiments, the early sinks may be other circuit elements other than a macro which have special timing requirements. Some embodiments may also operate where the early arrival timing requirement for the first sink is identified by an offset from the standard latency for the H-tree clock distribution network. Other embodiments may operate where the early arrival timing requirement for the first sink is identified by a first timing offset from a root clock input of the H-tree clock distribution network to the first sink, where the standard latency for the H-tree clock distribution network is identified by a second timing offset from the root clock input of the H-tree clock distribution network to the second sink, and where the standard latency for the H-tree clock distribution network is a longest latency from the root clock input to any sink of the plurality of sinks.

In some embodiments, early tapoff candidate locations are placed along the paths of the H-tree clock distribution network in positions separated from a nearest early tapoff candidate by a distance, a threshold candidate delay time, or using various other positioning criteria.

In some embodiments, the selection process for an early tapoff location may involve a preliminary process to narrow down the possible candidates. Such an embodiment may include additional operations beyond those of method 400. One such embodiment involves identifying a plurality of preliminary early tapoff candidate locations; estimating, for at least the first sink, a preliminary arrival time adjustment associated with each preliminary early tapoff candidate location of the plurality of preliminary early tapoff candidate locations; selecting a first preliminary early tapoff location from the plurality of preliminary early tapoff candidate locations based on the preliminary arrival time adjustment for the first preliminary early tapoff location and the early arrival timing requirement for the first sink; and determining that a latency for the first sink associated with the first preliminary early tapoff location is outside an acceptable latency threshold. In such an embodiment, the plurality of early tapoff locations may be selected based on the determination that the latency for the first sink associated with the first preliminary early tapoff location is outside the acceptable latency threshold, and wherein the plurality of early tapoff locations are further selected based on the first preliminary early tapoff location.

As described above, in some embodiments, an early tapoff location may be selected based on connections between an early sink and other sinks. In some such embodiments where a first sink is associated with one or more direct signal connections to a third sink of the plurality of sinks, a first early tapoff location is selected, at least in part, based on maximizing shared clock routes between the first sink and the third sink based on an identification of the one or more direct signal connections between the first sink and the third sink.

Figure 5:
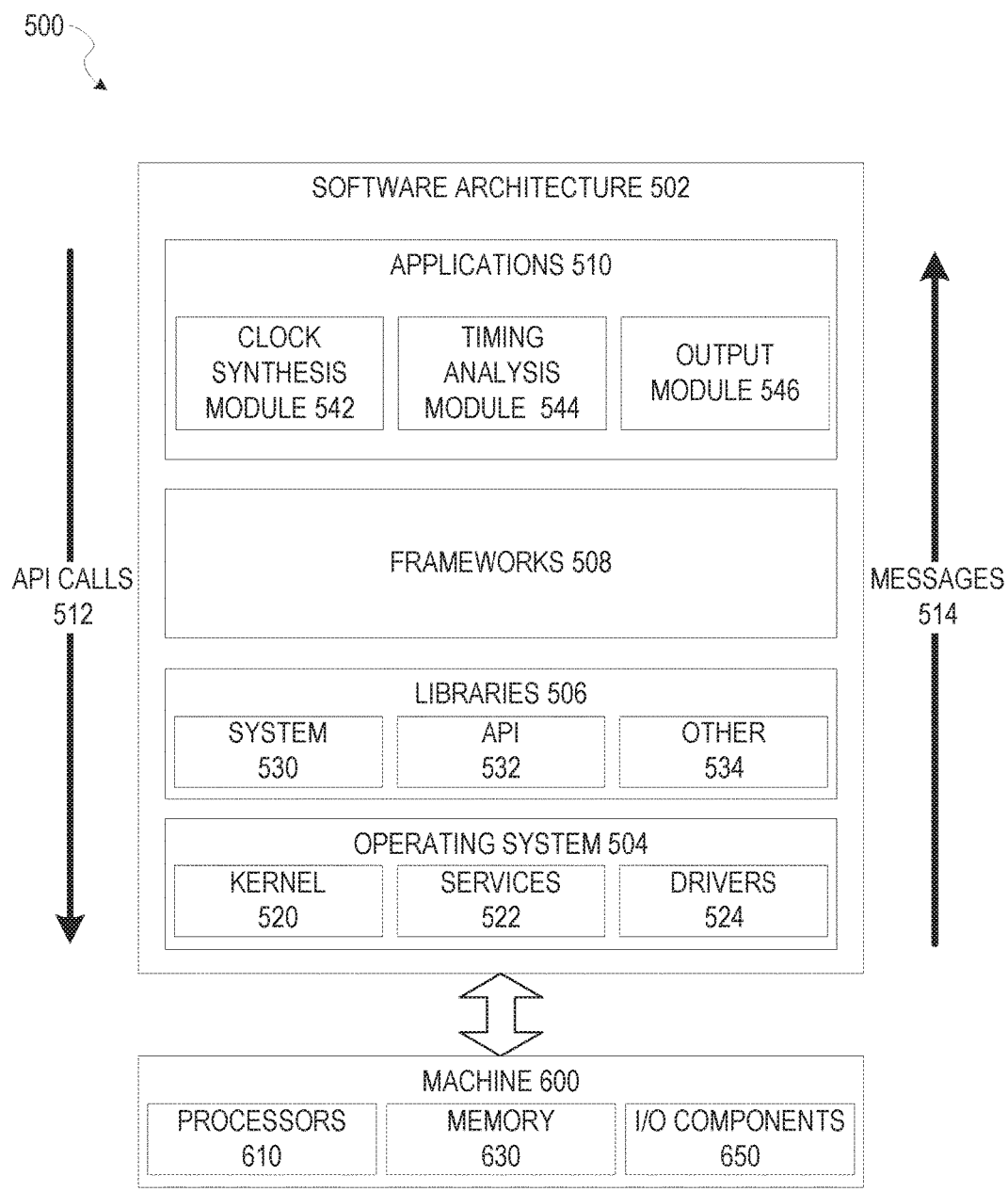
FIG. 5 is a block diagram illustrating an example of a software architecture that may be operating on an electronic design automation (EDA) computer and used with methods for modifying a balanced clock structure in a circuit design, according to some example embodiments.

FIG. 5 is a block diagram 500 illustrating an example of a software architecture 502 that may be operating on an electronic design automation (EDA) computer and used with methods for modifying a balanced clock structure, according to some example embodiments. Software architecture 502 can be used as an electronic design automation computing device to implement any of the methods described above. Aspects of software architecture 502 may, in various embodiments, be used to store circuit designs and execute timing analysis or optimization in an EDA environment to generate circuit designs, with physical devices generated using these circuit designs.

FIG. 5 is merely a non-limiting example of a software architecture 502, and it will be appreciated that many other architectures can be implemented to facilitate the functionality described herein. In various embodiments, the software architecture 502 is implemented by hardware such as machine 600 that includes processors 610, memory 630, and I/O components 650. In this example, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some embodiments. In various embodiments, any client device, server computer of a server system, or any other device described herein may operate using elements of software architecture 502. An EDA computing device described herein may additionally be implemented using aspects of the software architecture 502, with the architecture 502 adapted for operating to perform clock synthesis and modification of balanced clock structures in accordance with embodiments herein.

In one embodiment, an EDA application of applications 510 performs clock tree optimization and/or adjustments to a clock structure to manage early sinks, according to embodiments described herein, using various modules within software architecture 502. For example, in one embodiment, an EDA computing device similar to machine 600 includes memory 630 and one or more processors 610. The processors 610 implement clock synthesis module 542 to update a clock structure from input data for an integrated circuit design. The processors 610 also implement timing analysis module 544 to generate timing estimates for both an initial clock tree and for early sinks and candidate early tapoff locations.

Processor-implemented output module 546 may then be used to update a display of I/O components 650 of the EDA computing device with data associated with the set of timing analysis results.

In various other embodiments, rather than being implemented as modules of one or more applications 510, some or all of modules 542, 544, and 546 may be implemented using elements of libraries 506 or operating system 504.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 such as libraries of multi-instance blocks for use in an EDA environment or other libraries that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 506 may also include other libraries 534.

The software frameworks 508 provide a high-level common infrastructure that can be utilized by the applications 510, according to some embodiments. For example, the software frameworks 508 provide various graphic user interface (GUI) functions, high-level resource management, high-level location services, and so forth. The software frameworks 508 can provide a broad spectrum of other APIs that can be utilized by the applications 510, some of which may be specific to a particular operating system 504 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files and view definition files are examples that may operate within a software architecture 502, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 600 including processors 610), with these operations being accessible via a network (e.g., the Internet) and via one or more appropriate interfaces (e.g., an application program interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 600, but deployed across a number of machines 600. In some example embodiments, the processors 610 or processor-implemented modules are located in a single geographic location (e.g., within a home environment, an office environment, or a server farm). In other example embodiments, the processors 610 or processor-implemented modules are distributed across a number of geographic locations.

Figure 6:
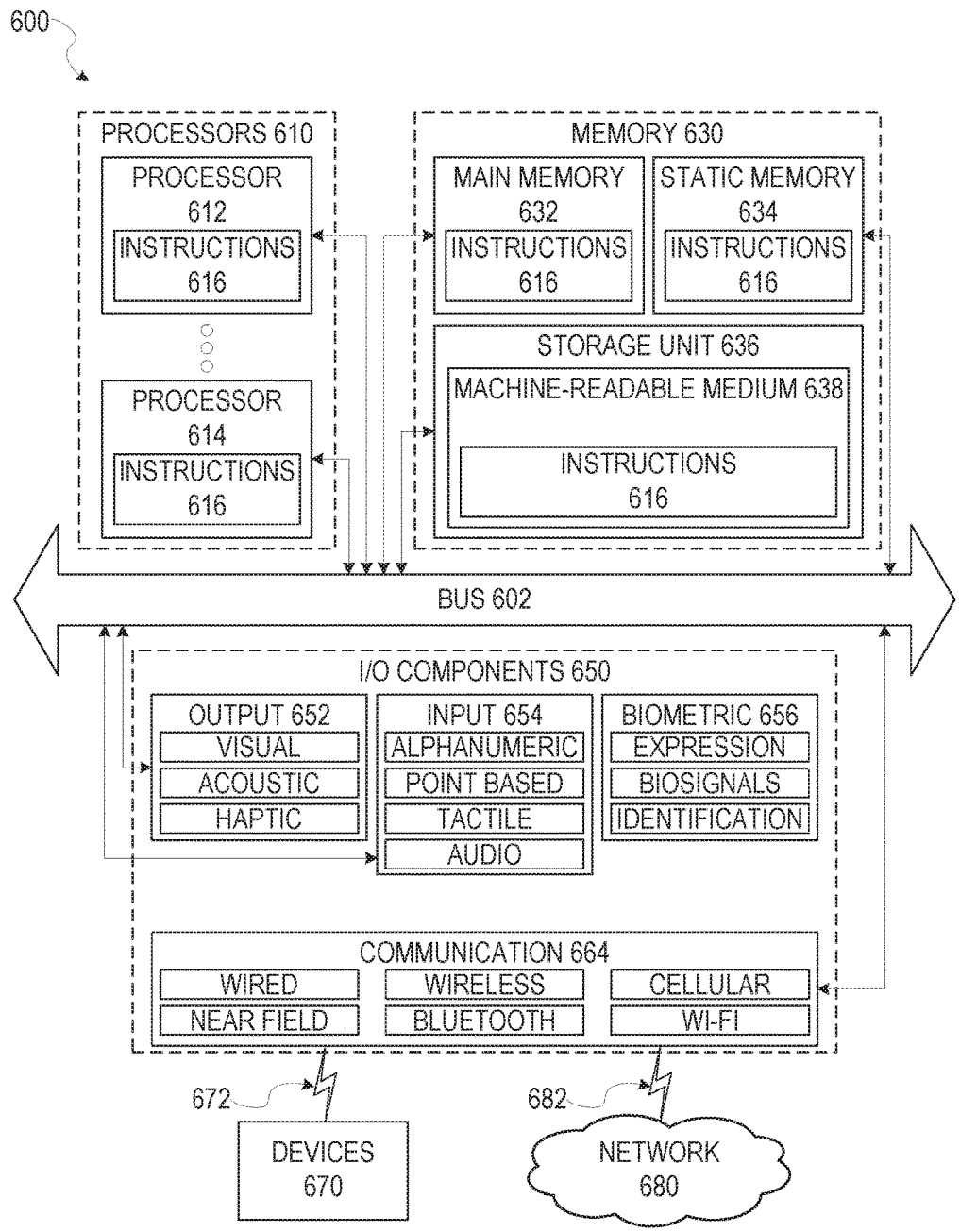
FIG. 6 is a diagrammatic representation of a machine in the form of a computer system within which a set of instructions are executed, causing the machine to perform any one or more of the methodologies discussed herein, according to some example embodiments.

FIG. 6 is a diagrammatic representation of the machine 600 in the form of a computer system within which a set of instructions may be executed for causing the machine 600 to perform any one or more of the methodologies discussed herein, according to an example embodiment. FIG. 6 shows components of the machine 600, which is, according to some embodiments, able to read instructions from a machine-readable medium (e.g., a machine-readable storage medium) and perform any one or more of the methodologies discussed herein. In some embodiments, the machine 600 may operate with instructions 616 (e.g., software, a program, an application, an applet, an app, or other executable code) for causing the machine 600 to perform any one or more of the methodologies discussed. In alternative embodiments, the machine 600 operates as a standalone device or can be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various embodiments, the machine 600 comprises processors 610, memory 630, and I/O components 650, which can be configured to communicate with each other via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute instructions 616 contemporaneously. Although FIG. 6 shows multiple processors 610, the machine 600 may include a single processor 612 with a single core, a single processor 612 with multiple cores (e.g., a multi-core processor 612), multiple processors 610 with a single core, multiple processors 610 with multiples cores, or any combination thereof.

The memory 630 comprises a main memory 632, a static memory 634, and a storage unit 636 accessible to the processors 610 via the bus 602, according to some embodiments. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various embodiments, the main memory 632, the static memory 634, and the processors 610 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example embodiment, to be a single medium, the term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements", "design elements", and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or another suitable device to interface with the network 680. In further examples, communication components 664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine or any of a wide variety of peripheral devices (e.g., a peripheral device coupled via a Universal Serial Bus (USB)).

Transmission Medium

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 638 is non-transitory (in other words, not having any transitory signals) in that it does not embody a propagating signal. However, labeling the machine-readable medium 638 "non-transitory" should not be construed to mean that the medium 638 is incapable of movement; the medium 638 should be considered as being transportable from one physical location to another. Additionally, since the machine-readable medium 638 is tangible, the medium 638 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computerized method for modifying a balanced clock structure, the method comprising:
   accessing, using one or more hardware processors, a circuit design stored in memory, the circuit design comprising an balanced clock tree structure, the balanced clock tree structure comprising a plurality of sinks;
   determining a timing requirement for each sink of the plurality of sinks, wherein at least a first sink of the plurality of sinks is an early sink associated with an early arrival timing requirement;
   identifying a plurality of early tapoff candidate locations;
   estimating, for at least the first sink, a corresponding arrival time adjustment associated with each early tapoff candidate location of the plurality of early tapoff candidate locations;
   selecting a first early tapoff location from the plurality of early tapoff candidate locations based on the corresponding arrival time adjustment for the first early tapoff location and the early arrival timing requirement for the first sink; and
   generating an updated circuit design file by inserting a connecting path from the first early tapoff location to the first sink into the circuit design and re-routing nets to which the first early tapoff is added.

2. The computerized method of claim 1, wherein the balanced clock tree structure is an H-tree clock distribution network;
   wherein at least a second sink of the plurality of sinks is associated with a standard latency for the H-tree clock distribution network; and
   wherein the first sink is a macro comprising a plurality of internal timing requirements and wherein one or more internal elements of the macro are associated with the standard latency for the H-tree clock distribution network.

3. The computerized method of claim 2, wherein the early arrival timing requirement for the first sink is identified by an offset from the standard latency for the H-tree clock distribution network.

4. The computerized method of claim 2, wherein the early arrival timing requirement for the first sink is identified by a first timing offset from a root clock input of the H-tree clock distribution network to the first sink;
   wherein the standard latency for the H-tree clock distribution network is identified by a second timing offset from the root clock input of the H-tree clock distribution network to the second sink; and
   wherein the standard latency for the H-tree clock distribution network is a longest latency from the root clock input to any sink of the plurality of sinks.

5. The computerized method of claim 1, wherein the plurality of early tapoff candidate locations are placed along the paths of the balanced clock tree structure in positions separated from a nearest early tapoff candidate by a distance determined by one or more distribution criteria.

6. The computerized method of claim 1, further comprising:
   identifying a plurality of preliminary early tapoff candidate locations;
   estimating, for at least the first sink, a preliminary arrival time adjustment associated with each preliminary early tapoff candidate location of the plurality of preliminary early tapoff candidate locations;
   selecting a first preliminary early tapoff location from the plurality of preliminary early tapoff candidate locations based on the preliminary arrival time adjustment for the first preliminary early tapoff location and the early arrival timing requirement for the first sink; and
   determining that a latency for the first sink associated with the first preliminary early tapoff location is outside an acceptable latency threshold;
   wherein the plurality of early tapoff locations are selected based on the determination that the latency for the first sink associated with the first preliminary early tapoff location is outside the acceptable latency threshold, and wherein the plurality of early tapoff locations are further selected based on the first preliminary early tapoff location.

7. The computerized method of claim 1, wherein the balanced clock tree structure further comprises a plurality of repeaters; and
   wherein at least a portion of the plurality of early tapoff candidate locations are associated with the plurality of buffers.

8. The computerized method of claim 7, wherein at least a second portion of the plurality of early tapoff candidate locations are placed along routing paths within the balanced clock tree structure.

9. The computerized method of claim 1, wherein the first early tapoff location is selected, at least in part, based on maximizing shared clock routes between the first sink and the plurality of sinks.

10. The computerized method of claim 1, wherein the first sink is associated with one or more direct signal connections to a third sink of the plurality of sinks; and
    wherein the first early tapoff location is selected, at least in part, based on maximizing shared clock routes between the first sink and the third sink based on an identification of the one or more direct signal connections between the first sink and the third sink.

11. The computerized method of claim 1, wherein the plurality of sinks comprises a plurality of macros, and wherein each macro of the plurality of macros is associated with a corresponding early arrival time.

12. The computerized method of claim 11, further comprising:
    estimating, for each macro of the plurality of macros, a corresponding arrival time adjustment associated with each early tapoff candidate location of the plurality of early tapoff candidate locations;
    selecting, for each macro of the plurality of macros, a selected early tapoff location from the plurality of early tapoff candidate locations, wherein the selected early tapoff location for each macro is determined based on a target latency for each macro and the corresponding early arrival time for each macro; and generating the updated circuit design file by inserting a connecting path from each macro to the selected early tapoff location for each macro and re-routing each balanced clock tree structure net attached the selected early tapoff location for each macro.

13. The computerized method of claim 12, further comprising:

analyzing, for at least a first route of the balanced clock tree structure within the updated circuit design file, a number of selected early tapoff locations; and determining if the number of selected early tapoff locations for the first route is above a threshold number of tapoffs for the first route.

14. The computerized method of claim 12, further comprising:

analyzing, for at least a first area of a layout for the updated circuit design file, a number of selected early tapoff locations; and determining if the number of selected early tapoff locations for the first area is above a threshold number of tapoffs for the first area.

15. The computerized method of claim 14, further comprising:

identifying, based on a determination that the number of selected early tapoff locations for the first area is above a threshold number of tapoffs for the first area, one or more sinks associated with corresponding tapoffs of the selected early tapoff locations, as excess sinks;

identifying, for each of the one or more excess sinks, a plurality of adjusted early tapoff candidate locations, wherein each location of the plurality of adjusted early tapoff candidate locations is outside the first area of the layout for the updated circuit design;

estimating, for each of the one or more excess sinks, second arrival time adjustments associated with each adjusted early tapoff candidate location;

selecting a corresponding adjusted early tapoff candidate location for each excess sink based on the second arrival time adjustment for each excess sink; and generating a second updated circuit design file by inserting an updated connecting path from each excess sink to the corresponding adjusted early tapoff candidate location selected for each excess sink.

16. A device for modifying a balanced clock distribution network within a circuit design, the device comprising:

a memory configured to store a circuit design file for the circuit design, the circuit design comprising the balanced clock distribution network, the balanced clock distribution network comprising a plurality of buffers and a plurality of sinks; and one or more processors coupled to the memory and configured for operations to:

calculate an estimated arrival time for each buffer of the plurality of buffers and for each sink of the plurality of sinks;

identify one or more early sinks from the plurality of sinks based on the estimated arrival time for each sink of the plurality of sinks;

identify one or more early tapoff candidate locations for each early sink;

estimate a corresponding arrival time adjustment for the one or more early tapoff candidate locations for each early sink;

select a corresponding early tapoff for each early sink based on the corresponding arrival time adjustment (s); and generate an updated circuit design file by inserting a corresponding early tapoff at the corresponding early tapoff candidate location for each early sink into the balanced clock distribution network, re-routing modified nets of the balanced clock distribution network including nets attached to the corresponding early tapoff location for each early sink, and inserting one or more route paths between the corresponding early tapoff and an associated early tapoff candidate of the plurality of sinks.

17. The device of claim 16, wherein at least a second sink of the plurality of sinks is associated with a standard latency for the balanced clock distribution network;

wherein a first sink of the one or more early sinks is a macro comprising a plurality of internal timing requirements;

wherein one or more internal elements of the macro are associated with the standard latency for the balanced clock distribution network; and wherein an early arrival timing requirement associated with the estimated arrival time for the first sink is identified by an offset from the standard latency of the balanced clock distribution network.

18. A computer-readable storage medium comprising instructions that, when executed by one or more processors of the device, cause the device to perform operations for modifying a clock distribution network within a circuit design, the operations comprising:

accessing the circuit design, wherein the circuit design comprises an balanced clock tree structure, the balanced clock tree structure comprising a plurality of sinks and a plurality of buffers;

determining a timing requirement for each sink of the plurality of sinks, wherein at least a first sink of the plurality of sinks is an early sink associated with an early arrival timing requirement;

identifying a plurality of early tapoff candidate locations associated with the plurality of buffers;

estimating, for at least the first sink, a corresponding arrival time adjustment associated with each early tapoff candidate location of the plurality of early tapoff candidate locations;

selecting a first early tapoff location from the plurality of early tapoff candidate locations based on the corresponding arrival time adjustment for the first early tapoff location and the early arrival timing requirement for the first sink; and generating an updated circuit design file by inserting a connecting path with at least a first tapoff buffer from the first early tapoff location to the first sink into the circuit design and re-routing affected nets.

19. The computer-readable storage medium of claim 18, wherein the circuit design comprises at least 10,000 sinks.

20. The computer-readable storage medium of claim 18 wherein the balanced clock tree structure is an H-tree clock distribution network; and wherein the operations further comprise:

accessing the circuit design to identify elements of a second H-tree clock distribution network separate from the H-tree clock distribution network within the circuit design, the second H-tree clock distribution network comprising a second plurality of sinks and a second plurality of buffers;

determining second timing requirements for each sink of the second plurality of sinks, wherein at least a second sink of the second plurality of sinks is a second early sink associated with a second early arrival timing requirement;

identifying a second plurality of early tapoff candidate locations;

estimating, for at least the second sink, second corresponding arrival time adjustments associated with each early tapoff candidate location of the second plurality of early tapoff candidate locations;

selecting a second early tapoff location from the second plurality of early tapoff candidate locations based on the second corresponding arrival time adjustment for the second early tapoff location and the second early arrival timing requirement for the second sink; and generating a second updated circuit design file by inserting a second connecting path from the second early tapoff location to the second sink into the updated circuit design file and re-routing second affected H-tree nets.

\* \* \* \* \*